(12) United States Patent
Kwok

(10) Patent No.: US 10,779,215 B2
(45) Date of Patent: Sep. 15, 2020

(54) RF POWER CONTROL FOR DUAL CONNECTIVITY

(71) Applicant: T-Mobile USA, Inc., Bellevue, WA (US)

(72) Inventor: Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/961,579

(22) Filed: Apr. 24, 2018

(65) Prior Publication Data

US 2019/0223077 A1 Jul. 18, 2019

Related U.S. Application Data

(60) Provisional application No. 62/618,512, filed on Jan. 17, 2018.

(51) Int. Cl.
*H04W 52/36* (2009.01)
*H04W 52/34* (2009.01)
(Continued)

(52) U.S. Cl.
CPC ....... *H04W 40/08* (2013.01); *H04L 29/08108* (2013.01); *H04M 11/06* (2013.01);
(Continued)

(58) Field of Classification Search
CPC ............. H04W 52/146; H04W 52/367; H04W 52/325; H04W 72/1268; H04W 52/08;
(Continued)

(56) References Cited

U.S. PATENT DOCUMENTS

| 8,897,799 B2 * | 11/2014 | Tsunekawa | ........... | H04L 5/0058 455/450 |
| 2015/0005027 A1 * | 1/2015 | Zeng | ................. | H04W 72/1278 455/522 |

(Continued)

FOREIGN PATENT DOCUMENTS

| WO | WO2013182215 A1 | 12/2013 |
| WO | WO2015113221 A1 | 8/2015 |

OTHER PUBLICATIONS

PCT Search Report & Written Opinion for PCT Application No. PCT/US19/13850, dated Mar. 27, 2019, 8 pages.

(Continued)

*Primary Examiner* — Gary Lafontant
(74) *Attorney, Agent, or Firm* — Lee & Hayes, P.C.

(57) ABSTRACT

A cellular communication device is configured to use a non-standalone (NSA) mode for communicating with a cellular communication network using simultaneous $4^{th}$-Generation (4G) Long-Term Evolution (LTE) and $5^{th}$-Generation (5G) Near Radio (NR) radio access technologies. In NSA mode, the UE may receive separate transmit power control commands for LTE transmissions and NR transmissions, respectively. In order to keep total transmitted power below a maximum allowable transmit power P_CMAX, NR transmissions are paused whenever either LTE or NR transmit power is commanded to be greater than half of P_CMAX. This allows LTE transmissions to continue at the commanded LTE transmit power, while preventing the device from exceeding the maximum allowable transmit power.

20 Claims, 3 Drawing Sheets

(51) Int. Cl.
  *H04W 40/08* (2009.01)
  *H04L 29/08* (2006.01)
  *H04M 11/06* (2006.01)
  *H04W 52/30* (2009.01)
  *H04W 52/14* (2009.01)
  *H04W 84/04* (2009.01)

(52) U.S. Cl.
  CPC ........... *H04W 52/30* (2013.01); *H04W 52/34* (2013.01); *H04W 52/367* (2013.01); *H04M 2207/18* (2013.01); *H04W 52/146* (2013.01); *H04W 84/042* (2013.01)

(58) Field of Classification Search
  CPC ........... H04W 52/246; H04W 28/0236; H04W 52/228; H04W 72/0406; H04W 72/1284; H04W 52/00; H04W 76/16; Y02D 70/10
  See application file for complete search history.

(56) References Cited

U.S. PATENT DOCUMENTS

| | | | |
|---|---|---|---|
| 2016/0242128 A1* | 8/2016 | Loehr | H04W 52/34 |
| 2017/0055223 A1 | 2/2017 | Shao et al. | |
| 2017/0142690 A1 | 5/2017 | Salami et al. | |
| 2017/0171825 A1 | 6/2017 | Takeda et al. | |
| 2018/0279227 A1* | 9/2018 | Kim | H04W 52/14 |
| 2019/0223114 A1 | 7/2019 | Kwok | |

OTHER PUBLICATIONS

Office Action for U.S. Appl. No. 15/961,597, dated Aug. 22, 2019, Kwok, "RF Power Control for Dual Connectivity", 16 pages.
Office Action for U.S. Appl. No. 15/961,597, dated Nov. 21, 2019, Kwok, "RF Power Control for Dual Connectivity," 17 pages.

* cited by examiner

RF POWER CONTROL FOR DUAL CONNECTIVITY

CROSS-REFERENCE TO RELATED APPLICATION

This application claims priority to a, commonly owned U.S. Provisional Patent Application No. 62/618,512 filed on Jan. 17, 2018, and titled "Adaptive Uplink Transmission Algorithm on Static Power Sharing Non-Standalone 5G User Equipment," which is herein incorporated by reference in its entirety.

BACKGROUND

Cellular communication devices use network radio access technologies to communicate wirelessly with geographically distributed cellular base stations. Long-Term Evolution (LTE) is an example of a widely implemented radio access technology that is used in $4^{th}$ Generation (4G) communication systems. New Radio (NR) is a newer radio access technology that is used in $5^{th}$ Generation (5G) communication systems. Standards for LTE and NR radio access technologies have been developed by the 3rd Generation Partnership Project (3GPP) for use by wireless communication carriers.

A communication protocol defined by the 3GPP, referred to as Non-Standalone (NSA), specifies the simultaneous use of LTE and NR for communications between a mobile device and a communication network. Specifically, NSA uses Dual Connectivity (DC), in which a user equipment (UE) uses both an LTE carrier and an NR carrier for uplink transmissions to corresponding 4G and 5G base stations. The LTE carrier is used for control-plane messaging and for user-plane communications. The NR carrier is used for additional user-plane bandwidth. In a scenario such as this, the LTE carrier is said to "anchor" the communication session.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are components and techniques for managing RF transmit power of a cellular communication device that is operating in a Non-Standalone (NSA) mode, in which data uplinks use both $4^{th}$-Generation (4G) and $5^{th}$-Generation (5G) radio access technologies. Long-Term Evolution (LTE) is an example of 4G radio access technology. New Radio (NR) is an example of 5G radio access technology.

In a described embodiment, a data stream is divided into a first portion that will be transmitted using LTE communications and a second portion that will be transmitted in parallel using NR communications. When simultaneously using both an LTE uplink and an NR uplink, the combined radio transmit power for the carriers of the uplinks is to remain below a regulated maximum allowed transmit power, which is referred to as P_CMAX. However, LTE transmit power and NR transmit power are controlled independently by transmit power control commands from respective LTE and NR base stations. In many situations, the LTE and NR base stations do not coordinate with each other, which may result in the base stations requesting a combination of LTE and NR transmit powers that together exceed P_CMAX.

In a described embodiment, a UE is configured when in NSA mode to receive independent LTE and NR transmit power commands (TPCs) from LTE and NR base stations. Transmit power control commands are received periodically to request varying power levels as the UE moves. The UE uses a requested LTE transmit power as long as the requested LTE transmit power is less than or equal to P_CMAX. The UE uses the requested NR transmit power as long as neither the requested LTE transmit power nor the requested NR transmit power exceeds a power threshold, referred to herein as P_threshold. If either the requested LTE transmit power or the requested NR transmit power exceeds P_threshold, NR transmissions are paused while LTE transmissions continue. This allows LTE power to be increased above P_threshold, up to P_CMAX, while ensuring that the combined LTE and NR transmit power does not exceed P_CMAX.

In certain embodiments, P_threshold equals half of P_CMAX. That is, $$P\_threshold = \frac{P\_CMAX}{2}.$$

Because the UE uses LTE and NR simultaneously only when both the requested LTE transmit power and the requested 5G transmit power are less than or equal to $$\frac{P\_CMAX}{2},$$

the maximum actual combined transmit power when transmitting both LTE and NR signals will be P_CMAX (i.e., $$\frac{P\_CMAX}{2} + \frac{P\_CMAX}{2} = P\_CMAX).$$

The described techniques are relatively easy to implement in LTE and NR chipsets, and may be particularly useful when implemented in existing devices or chipsets that were not originally designed to implement 5G NSA dual connectivity.

Figure 1:
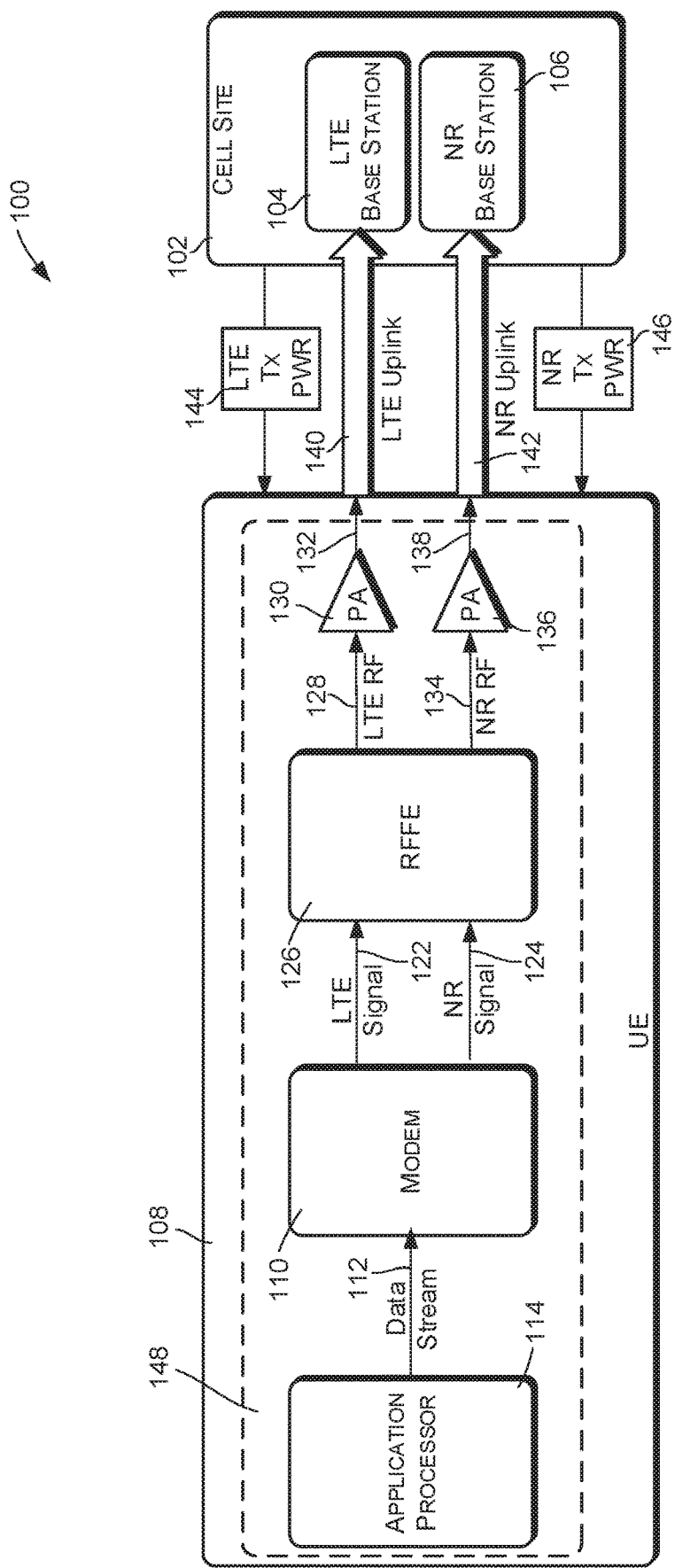
FIG. 1 is a block diagram of a cellular communication device configured for dual connectivity with base stations of a cellular site.

FIG. 1 illustrates relevant high-level components of a system 100 in which the described techniques may be implemented. The components shown in FIG. 1 may be used to implement Dual-Connectivity, for use in a Non-Standalone (NSA) configuration. When using NSA, a communication device establishes an LTE carrier and an NR carrier, and simultaneously uses both carriers for uplink transmissions to respective LTE and NR base stations. The LTE carrier is used for control-plane messaging and for user-plane communications. The NR carrier is used for additional user-plane bandwidth.

For purposes of discussion, a 4G or LTE component is a component that performs according to 4G or LTE communications standards. A 4G or LTE signal or communication is a signal or communication that accords with 4G or LTE communications standards. A 5G or NR component is a component that performs according to 5G or NR communications standards. A 5G or NR signal or communication is a signal or communication that accords with 5G or NR communications standards.

FIG. 1 shows a single cell site 102, which may be one of many such cell sites in a cellular communication network. The cell site 102 has cellular base stations to support both 4G and 5G communications. More specifically, the cell site 102 has an LTE base station 104 such as used in 4G cellular networks, and an NR base station 106 such as used in 5G cellular networks. An LTE base station is often referred to as an eNodeB. An NR base station is often referred to as a gNodeB. An eNodeB is a base station that implements 4G LTE radio access technologies. A gNodeB is a base station that implements 5G NR radio access technologies.

FIG. 1 also shows relevant components of a single user equipment (UE) 108, which may be one of many such UEs that are configured for use within a cellular communication network. The UE 108 may comprise any of various types of cellular communication devices that are capable of wireless data and/or voice communications, including smartphones and other mobile devices, "Internet-of-Things" (IoT) devices, smart home devices, computers, wearable devices, entertainment devices, industrial control equipment, etc. In some environments, the UE 108 may be referred to as a mobile station (MS).

The UE 108 has an internal modem 110 that receives a data stream 112 from an application processor 114. The data stream 112 contains data that is to be transmitted wirelessly to a cellular communication network through the LTE base station 104 and the NR base station 106. The modem 110 implements NSA dual connectivity by dividing the data stream 112 into an LTE portion and an NR portion, and producing corresponding LTE and NR signals 122 and 124.

For purposes of discussion, the portion of the data stream 112 that is to be transmitted using LTE radio access technology will be referred to as LTE data. The portion of the data stream 112 that is to be transmitted using NR radio access technology will be referred to as NR data.

The LTE signal 122 is an RF signal that is modulated to represent the LTE data. The NR signal 124 is an RF signal that is modulated to represent the NR data.

A radio-frequency front end (RFFE) 126 receives and processes the LTE signal 122 to produce an LTE RF signal 128, which is amplified by a power amplifier (PA) 130 to produce an LTE output signal 132. The RFFE 126 receives and processes the NR signal 124 to produce an NR RF signal 134, which is amplified by a PA 136 to produce an NR output signal 138. The modem 110 controls the PAs 130 and 136 to control the transmit power of the LTE output signal 132 and the NR output signal 138.

When the UE 108 is configured to use NSA dual connectivity, the UE 108 establishes a primary radio uplink 140 with the LTE base station 104 and a secondary radio uplink 142 with the NR base station 106. The primary radio uplink 140, which will also be referred to herein as an LTE uplink 140, is a wireless communication channel that uses LTE radio access technology to transmit the LTE data. The secondary radio uplink 142, which will also be referred to herein as an NR uplink 142, is a wireless communication channel that uses NR radio access technology to transmit the NR data.

Each of the base stations 104 and 106 periodically sends a transmit power control (TPC) command to the UE 108, requesting that the UE 108 configure its output signals 132 and 138 at requested levels of transmit power. Specifically, the LTE base station 104 periodically sends an LTE power control command 144, which is received and acted upon by the modem 110. The LTE power control command 144 specifies a requested LTE transmit power for the LTE uplink 140. The NR base station 106 periodically sends an NR power control command 146, which is also received and acted upon by the modem 110. The NR power control command 146 specifies a requested NR transmit power for the NR uplink 142. Power commands such as this may be referred to as transmit power control (TPC) commands in some environments.

Power control commands are sent to the UE 108 from each of the base stations 104 and 106 at a rate of around 1000 times per second. The requested transmit powers are based on received signal strengths at the cell site 102, and vary as the UE 108 moves about.

The modem 110 controls the LTE PA 130 and/or other components of the UE 108 to produce an LTE transmit power equal to the requested LTE transmit power. Subject to the techniques described below, the modem 110 also controls the NR PA 136 and/or other components of the UE 108 to produce an NR transmit power equal to the requested NR transmit power.

The illustrated components of the UE 108 may in some embodiments be implemented by a chipset or system-on-chip (SOC) 148, which may comprise one or more integrated circuits. Components such as the modem, RFFE, and PAs may be distributed or arranged in various ways among integrated circuits of the chipset 148. Additionally, UEs may be configured differently than shown in FIG. 1. In some UEs, for example, the LTE output signal 132 and the NR output signal 138 may be combined and connected to one or more common antennas. As another example, some UEs may use only a single power amplifier, and may produce a composite signal that is connected to one or more common antennas. In some UEs, transmit power might be controlled in part by varying the magnitudes of the LTE RF signal 128 and the NR RF signal 134. In some UEs, transmit power might be controlled in part by varying the magnitudes of the LTE signal 122 and NR signal 124.

Although the UE 108 is illustrated as communicating through a single cell site 102 using both LTE and NR communications, it may be that in certain situations the LTE communications are through a first cell site and the NR communications are through a second, different cell site.

Figure 2:
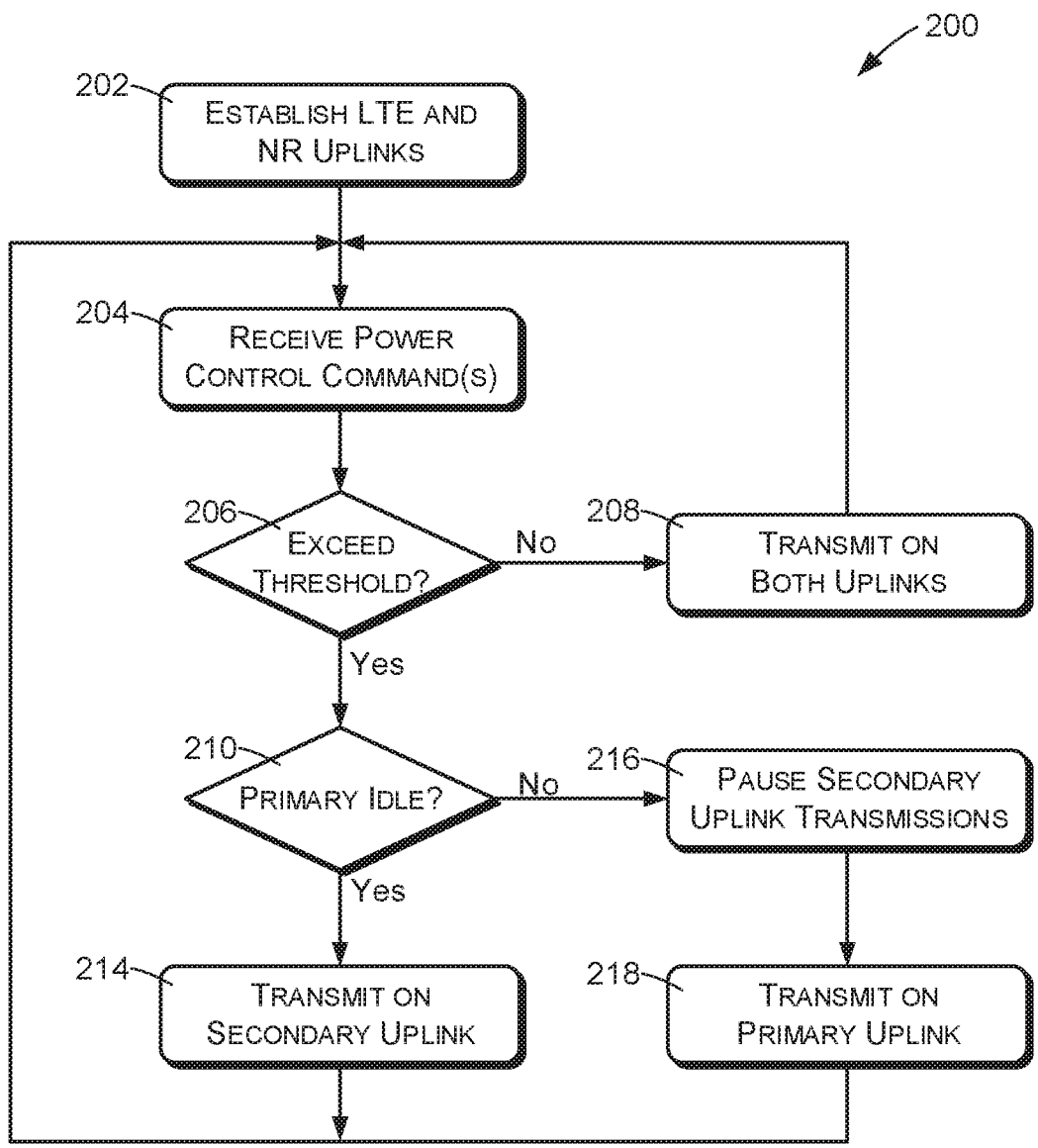
FIG. 2 is a flow diagram illustrating an example method of controlling transmit power of LTE and NR uplinks when using dual connectivity.

FIG. 2 illustrates an example method 200 that may be performed by a cellular communication device to control transmit power when operating using dual connectivity, such as when operating in an NSA mode of a 5G communication network or a hybrid 4G/5G communication network. In the described embodiment, the example method 200 may be performed by the modem 110 of the UE 108, in cooperation with other components such as the RFFE 126, the PAs 130 and 136, and/or other components of the UE 108 that are not shown in FIG. 1.

An action 202 comprises establishing the LTE and NR radio uplinks 140 and 142 between the UE 108 and the base stations 104 and 106. When in NSA mode, the LTE and NR uplinks are used simultaneously to send a stream of data to a cellular communication network. The action 202 may include transmitting a first portion of the data stream using the LTE uplink and the second portion of the data stream using the NR uplink.

The LTE uplink 140 may be in a relatively low radio frequency band, such as a band below 3 GHz that is typically used by LTE systems. The NR uplink 142 may be in the same LTE frequency band or in a relatively high radio frequency band, such as a band above 24 GHz that is available for use by 5G NR systems.

An action 204 comprises receiving one or more transmit power control (TPC) commands. The transmit power control commands are received asynchronously from the LTE base station 104 and the NR base station 106. Each LTE transmit power control command received from the LTE base station 104 specifies a requested transmit power for the LTE uplink 140 of the UE 108. Each NR transmit power control command received from the NR base station 106 specifies a requested transmit power for the NR uplink 142 of the UE 108.

The LTE base station 104 and the NR base station 106 operate independently and asynchronously to specify the requested transmit powers for LTE and NR uplinks. Each base station frequently adjusts its requested transmit power to achieve an adequate signal strength from the UE 108 as the UE 108 moves about. Each of the transmit power control commands specifies a requested transmit power of up to the maximum allowable transmit power of the UE 108, referred to as P_CMAX, which in some situations might be 23 dBm as an example. In some cases, each of the LTE base station 104 and the NR base station 106 may specify a requested transmit power that approaches or is equal to P_CMAX, which if implemented by the UE 108 would cause the UE 108 to exceed P_CMAX.

An action 206 comprises determining whether at least one of the requested LTE transmit power and the requested NR transmit power exceeds a power threshold, where the power threshold is less than the maximum allowed transmit power P_CMAX of the UE 108 in its current operating environment. In some embodiments, the power threshold, referred to herein as P_threshold, may be specified as being equal to half of P_CMAX:

$$P_{threshold} = \frac{P\_CMAX}{2}.$$

In response to determining that neither of the requested LTE transmit power and the requested NR transmit power exceed P_threshold, an action 208 is performed. The action 208 comprises transmitting, or continuing to transmit, using both of the established radio uplinks at the requested transmit powers. If NR transmissions were previously paused, the action 208 comprises resuming the transmitting of the NR data, with the NR uplink at the most recently requested NR transmit power. Because the requested LTE and NR transmit powers are each less than $$\frac{P\_CMAX}{2}$$

in this situation, the overall, total transmit power of the UE 108 will be less than or equal to P_CMAX.

In response to determining that at least one of the requested LTE transmit power and the requested NR transmit power exceeds P_threshold, an action 210 is performed. The action 210 comprises determining whether the primary radio uplink is idle. This may occur after the UE 108 has transmitted all available LTE data and the transmitting of further LTE data has at least temporarily stopped.

In response to determining that the LTE uplink is idle, an action 214 is performed of transmitting, or resuming transmitting the NR data, using the most recently requested NR transmit power for the NR uplink 142.

In response to determining that (a) at least one of the requested transmit powers is greater than P_threshold and (b) the LTE radio uplink is not idle, an action 216 is performed of pausing NR transmissions on the NR radio uplink. Although NR transmissions are paused, the NR uplink does not need to be taken down.

Also in response to determining that (a) at least one of the requested transmit powers is greater than P_threshold and (b) the primary radio uplink is not idle, an action 218 is performed of transmitting or continuing to transmit the LTE data, using the LTE uplink 140 at the most recently requested LTE transmit power, which may exceed P_CMAX.

The actions subsequent to the action 202 are repeated as new transmit power control commands are received in the action 204. The illustrated method 200 results in pausing NR uplink transmissions whenever either the requested LTE power or the requested NR power is greater than $$\frac{P\_CMAX}{2},$$

ensuring that total transmit power of the UE 108 is less than P_CMAX. NR uplink transmissions are resumed whenever either (a) the primary radio uplink is idle or (b) reception of a new LTE or NR power command results in both of the requested LTE and NR transmit powers being less than or equal to $$\frac{P\_CMAX}{2}.$$

As an example illustrating the effect of the method 200, the UE 108 may receive multiple power control commands from both the LTE base station 104 and the NR base station 106. At some point, the most recently received power control commands might specify a requested transmit power, for either the LTE uplink 140 or the NR uplink 142, that is greater than P_threshold. In response to this situation, transmission of the NR data on the NR uplink will be paused, while LTE transmissions on the LTE uplink continue at the most recently requested LTE transmit power. At a later time, after receiving additional power control commands, the most recently received power control commands may specify LTE and NR transmit powers that are each less than or equal to P_threshold, whereupon transmissions of the NR data on the NR uplink are resumed at the most recently requested NR power, simultaneously with LTE uplink transmissions.

As another example, at some time after pausing NR transmissions, the LTE uplink may become idle, and secondary uplink transmissions may be resumed at least until the LTE radio uplink is no longer idle.

As another example, the received power control commands might specify a requested transmit power, for either the LTE uplink 140 or the NR uplink 142, that is greater than P_threshold. If these commands are received at a time when the LTE uplink is idle, NR transmissions will continue. If at a later time the LTE uplink 140 is no longer idle, and if a transmit power greater than P_threshold is still being requested, the NR transmissions may be paused.

Note that in each of the cases described above, transmissions of the LTE data on the LTE uplink are not paused or interrupted, and the most currently requested LTE transmit power is used for the LTE uplink, i.e. the LTE uplink transmission shall always follow the network power control command.

Figure 3:
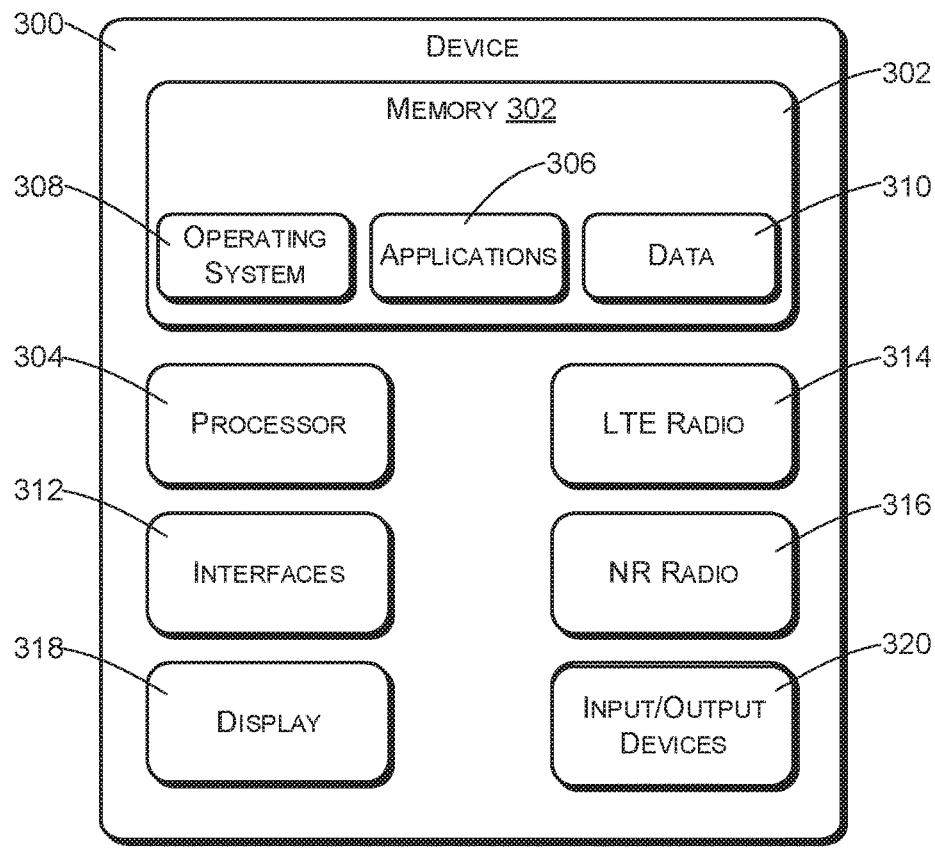
FIG. 3 is a block diagram of an example cellular communication device.

FIG. 3 illustrates high-level components of an example cellular communication device 300 that may be used to implement the techniques described herein. The device 300 is an example of a UE 108 as shown in FIG. 1. The method 200 of FIG. 2, for example, may be implemented by a device such as the device 300. FIG. 3 shows only basic, high-level components of the device 300.

The device 300 may include memory 302 and a processor 304. The memory 302 may include both volatile memory and non-volatile memory. The memory 302 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 302 may include a SIM (subscriber identity module), which is a removable smart card used to identify a user of the device 300 to a service provider network.

The memory 302 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information. The memory 302 may in some cases include storage media used to transfer or distribute instructions, applications, and/or data. In some cases, the memory 302 may include data storage that is accessed remotely, such as network-attached storage that the device 300 accesses over some type of data communication network.

The memory 302 stores one or more sets of computer-executable instructions (e.g., software) such as programs that embody operating logic for implementing and/or performing desired functionality of the device 300. The instructions may also reside at least partially within the processor 304 during execution thereof by the device 300. Generally, the instructions stored in the computer-readable storage media may include various applications 306 that are executed by the processor 304, an operating system (OS) 308 that is also executed by the processor 304, and data 310.

In some embodiments, the processor(s) 304 is a central processing unit (CPU), a graphics processing unit (GPU), both CPU and GPU, or other processing unit or component known in the art. Furthermore, the processor(s) 304 may include any number of processors and/or processing cores. The processor(s) 304 is configured to retrieve and execute instructions from the memory 302.

The device 300 may have interfaces 312, which may comprise any sort of interfaces known in the art. The interfaces 312 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 300 may also have an LTE radio 314 and an NR radio 316, which may be used as described above for implementing dual connectivity in conjunction with LTE and NR base stations as described above. The radios 314 and 316 may be implemented in part by components of FIG. 1 such as the modem 110, the RFFE 126, and the PAs 130 and 136.

The device 300 may have a display 318, which may comprise a liquid crystal display or any other type of display commonly used in telemobile devices or other portable devices. For example, the display 318 may be a touch-sensitive display screen, which may also act as an input device or keypad, such as for providing a soft-key keyboard, navigation buttons, or the like.

The device 300 may have input and output devices 320. These devices may include any sort of output devices known in the art, such as a display (already described as display 318), speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display (such as the touch-sensitive display screen described above). A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Figure 4:
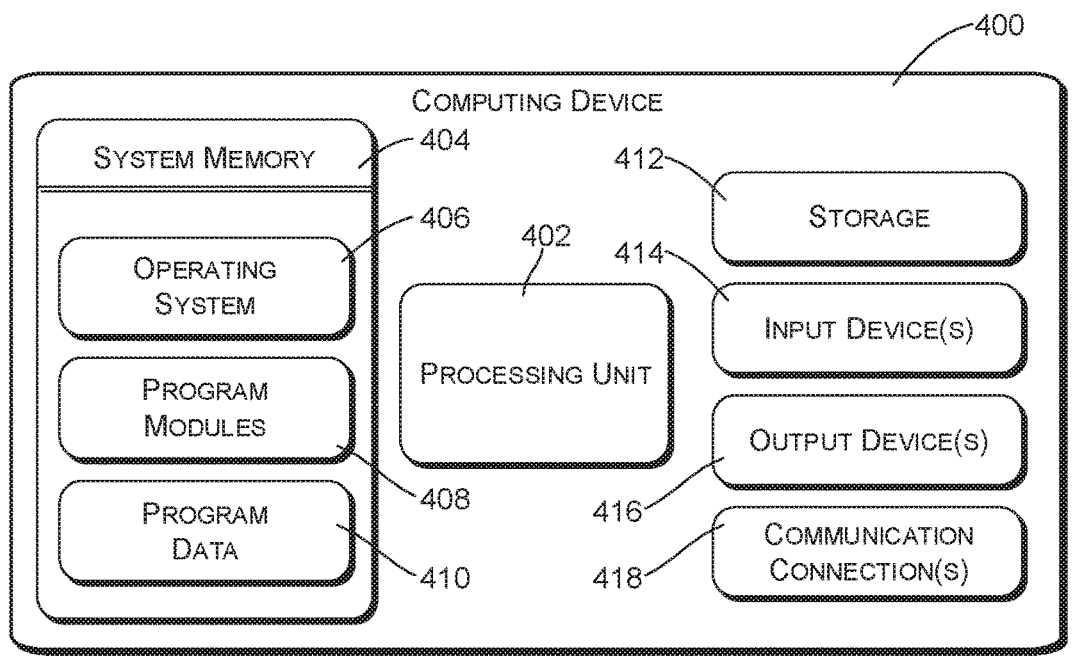
FIG. 4 is a block diagram of an example computing device that may be used to implement various functionality described herein.

FIG. 4 is a block diagram of an illustrative computing device 400 such as may be used to implement various components of a core network, a base station, and/or any servers, routers, gateways, administrative components, that may be used by a communications provider etc. One or more computing devices 400 may be used to implement each of the base stations 104 and 106, for example.

In various embodiments, the computing device 400 may include at least one processing unit 402 and system memory 404. Depending on the exact configuration and type of computing device, the system memory 404 may be volatile (such as RAM), non-volatile (such as ROM, flash memory, etc.) or some combination of the two. The system memory 404 may include an operating system 406, one or more program modules 408, and may include program data 410.

The computing device 400 may also include additional data storage devices (removable and/or non-removable) such as, for example, magnetic disks, optical disks, or tape. Such additional storage devices are illustrated in FIG. 4 as storage 412.

Non-transitory computer storage media of the computing device 400 may include volatile and nonvolatile, removable and non-removable media implemented in any method or technology for storage of information, such as computer readable instructions, data structures, program modules, or other data. The system memory 404 and storage 412 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such non-transitory computer-readable storage media may be part of the computing device 400.

In various embodiment, any or all of the system memory 404 and storage 412 may store programming instructions which, when executed, implement some or all of the function functionality described above as being implemented by the base stations 104 and 106.

The computing device 400 may also have input device(s) 414 such as a keyboard, a mouse, a touch-sensitive display, voice input device, etc. Output device(s) 416 such as a display, speakers, a printer, etc. may also be included. The computing device 400 may also contain communication connections 418 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. A cellular communication device, comprising:
   one or more processors; and
   one or more non-transitory computer-readable media storing computer-executable instructions that, when executed by the one or more processors, cause the cellular communication device to perform actions comprising:
      transmitting first data of a data stream to a first cellular base station using a first radio uplink that uses a first data communication network type, the first data communication network type including a Long-Term Evolution (LTE) radio access technology;
      transmitting second data of the data stream to a second cellular base station using a second radio uplink that uses a second data communication network type, the second data communication network type including a New Radio (NR) radio access technology;
      receiving a first power control command from the first cellular base station, wherein the first power control command specifies a first requested transmit power for the first radio uplink;
      receiving a second power control command from the second cellular base station, wherein the second power control command specifies a second requested transmit power for the second radio uplink;
      determining that transmit power including at least one of the first requested transmit power and the second requested transmit power exceeds a threshold; and
      determining to continue transmitting the first data and to pause transmitting the second data, based at least in part on the transmit power exceeding the threshold and the first radio uplink using the first data communication network type that includes the LTE radio access technology, wherein determining to pause transmitting the second data includes maintaining the second radio uplink to receive periodic second power control commands from the second cellular base station at a predetermined time interval and is based at least in part on determining that at least one of the first requested transmit power and the second requested transmit power exceed half of a maximum allowed transmit power of the cellular communication device and the second radio uplink is not idle.

2. The cellular communication device of claim 1, the actions further comprising:
   determining that the first radio uplink is idle; and
   in response to determining that the first radio uplink is idle, resuming the transmitting of the second data.

3. The cellular communication device of claim 1, the actions further comprising:
   receiving a third power control command from the first cellular base station, wherein the third power control command specifies a third requested transmit power for the first radio uplink;
   receiving a fourth power control command from the second cellular base station, wherein the fourth power control command specifies a fourth requested transmit power for the second radio uplink;
   determining that neither of the third requested transmit power and fourth requested transmit power exceeds the threshold; and
   in response to determining that neither of the third requested transmit power and fourth requested transmit power exceeds the threshold, resuming the transmitting of the second data.

4. The cellular communication device of claim 1, wherein the first requested transmit power is less than the maximum allowed transmit power of the cellular communication device.

5. The cellular communication device of claim 1, wherein the threshold equals half of the maximum allowed transmit power of the cellular communication device.

6. The cellular communication device of claim 1, wherein determining to continue transmitting the first data further comprises:
   determining that the first radio uplink is a primary uplink based at least in part on the first radio uplink using the LTE radio access technology;
   determining that the second radio uplink is a secondary uplink based at least in part on the second radio uplink using the NR radio access technology; and
   determining that the secondary uplink may be paused for the primary uplink.

7. The cellular communication device of claim 1, wherein the first radio uplink and the second radio uplink implement a non-standalone (NSA) mode of a 5th-Generation (5G) communication network.

8. A method performed by a cellular communication device, comprising:
   transmitting first data of a data stream using a first radio uplink that uses a first communication channel of a first radio access technology;
   transmitting second data of the data stream using a second radio uplink that uses a second communication channel of a second radio access technology;
   receiving one or more power control commands that specify (a) a first requested transmit power for the first communication channel and (b) a second requested transmit power for the second communication channel;
   determining that at least one of the first requested transmit power and the second requested transmit power exceeds a threshold;
   determining to avoid interrupting the transmitting of the first data by pausing the transmitting of the second data; and in response to determining that at least one of the first requested transmit power and the second requested transmit power exceeds the threshold, pausing the transmitting of the second data based at least in part on determining that at least one of the first requested transmit power and the second requested transmit power exceed half of a maximum allowed transmit power of the cellular communication device and the second radio uplink is not idle, wherein pausing the transmitting includes maintaining the second radio uplink.

9. The method of claim 8, further comprising:
determining that the transmitting of the first data has stopped; and
in response to determining that the transmitting of the first data has stopped, resuming the transmitting of the second data.

10. The method of claim 8, further comprising:
receiving one or more power control commands that specify (a) a third requested transmit power for the first communication channel and (b) a fourth requested transmit power for the second communication channel;
determining that neither of the third requested transmit power and the fourth requested transmit power exceed the threshold; and
in response to determining that neither of the third requested transmit power and the fourth requested transmit power exceed the threshold, resuming the transmitting of the second data.

11. The method of claim 8, wherein the threshold equals half of the maximum allowed transmit power of the cellular communication device.

12. The method of claim 8, wherein the first radio access technology is a Long-Term Evolution (LTE) radio access technology and the second radio access technology is a New Radio (NR) radio access technology.

13. The method of claim 8, wherein the first and second communication channels implement a non-standalone (NSA) mode of a 5th-Generation (5G) communication network.

14. One or more integrated circuits for use in a cellular communication device, the one or more integrated circuits comprising:
one or more processors; and
one or more non-transitory computer-readable media storing computer-executable instructions that, when executed by the one or more processors, cause the cellular communication device to perform actions comprising:
transmitting first data of a data stream using a first radio uplink that uses a first communication channel of a first radio access technology;
transmitting second data of the data stream using a second radio uplink that uses a second communication channel of a second radio access technology;
receiving one or more power control commands that specify (a) a first requested transmit power for the first communication channel and (b) a second requested transmit power for the second communication channel;
determining that at least one of the first requested transmit power and the second requested transmit power exceeds a threshold; and
in response to determining that at least one of the first requested transmit power and the second requested transmit power exceeds the threshold, pausing the transmitting of the second data based at least in part on:
determining that transmission of a portion of the data stream using the first radio access technology is to be uninterrupted; and
determining that at least one of the first requested transmit power and the second requested transmit power exceed half of a maximum allowed transmit power of the cellular communication device and the second radio uplink is not idle, wherein pausing the transmitting includes maintaining the second radio uplink.

15. The one or more integrated circuits of claim 14, the actions further comprising:
determining that the transmitting of the first data has stopped; and
in response to determining that the transmitting of the first data has stopped, resuming the transmitting of the second data.

16. The one or more integrated circuits of claim 14, the actions further comprising:
receiving a first instruction to use a third requested transmit power for the first communication channel;
receiving a second instruction to use a fourth requested transmit power for the second communication channel;
determining that neither of the third requested transmit power and the fourth requested transmit power exceed the threshold; and
in response to determining that neither of the third requested transmit power and the fourth requested transmit power exceed the threshold, resuming the transmitting of the second data.

17. The one or more integrated circuits of claim 14, wherein the threshold is less than the maximum allowed transmit power of the cellular communication device.

18. The one or more integrated circuits of claim 14, wherein the threshold equals half of the maximum allowed transmit power of the cellular communication device.

19. The one or more integrated circuits of claim 14, wherein the first radio access technology is a Long-Term Evolution (LTE) radio access technology and the second radio access technology is a New Radio (NR) radio access technology.

20. The one or more integrated circuits of claim 14, wherein the first and second communication channels implement a non-standalone (NSA) mode of a 5th-Generation (5G) communication network.

* * * * *